(12) United States Patent
Van Der Doe

(10) Patent No.: US 6,929,812 B2
(45) Date of Patent: Aug. 16, 2005

(54) DEVICE AND METHOD FOR FRYING PRODUCTS

(75) Inventor: Martin Hendrik Van Der Doe, Krabbendijke (NL)

(73) Assignee: Terra Chips B.V., AB Krabbenduke (NL)

(*) Notice: Subject to any disclaimer, the term of this patent is extended or adjusted under 35 U.S.C. 154(b) by 36 days.

(21) Appl. No.: 10/276,299
(22) PCT Filed: May 23, 2001
(86) PCT No.: PCT/NL01/00396
§ 371 (c)(1), (2), (4) Date: Nov. 22, 2002
(87) PCT Pub. No.: WO01/91580
PCT Pub. Date: Dec. 6, 2001

(65) Prior Publication Data
US 2004/0031396 A1 Feb. 19, 2004

(30) Foreign Application Priority Data
May 24, 2000 (WO) .............................. PCT/NL00/00355

(51) Int. Cl.[7] ................................................ A23L 1/01
(52) U.S. Cl. ........................ 426/438; 426/443; 426/523
(58) Field of Search ................................ 426/443, 438, 426/486–488, 523; 99/407, 409, 472; 34/58–59

(56) References Cited

U.S. PATENT DOCUMENTS

| | | | | |
|---|---|---|---|---|
| 3,718,485 A | * | 2/1973 | Lankford | 426/438 |
| 3,812,775 A | | 5/1974 | Sijbring | 99/404 |
| 4,059,046 A | * | 11/1977 | Yamazaki et al. | 99/355 |
| 4,566,376 A | * | 1/1986 | Webb | 99/468 |
| 4,828,859 A | | 5/1989 | Imai | 426/302 |
| 4,852,475 A | | 8/1989 | Yang | 99/404 |
| 5,168,797 A | * | 12/1992 | Wang | 99/342 |
| 5,490,453 A | * | 2/1996 | Mackay | 99/495 |
| 5,743,840 A | * | 4/1998 | Carr | 494/13 |
| 5,988,051 A | | 11/1999 | Hashiguchi et al. | 99/472 |

FOREIGN PATENT DOCUMENTS

| | | |
|---|---|---|
| EP | 0 234 996 A1 | 9/1987 |
| EP | 0234996 | 9/1987 |
| EP | 0545909 | 6/1993 |
| EP | 0 545 909 A2 | 6/1993 |
| EP | 000550405 A2 * | 7/1993 |

* cited by examiner

Primary Examiner—Drew Becker
(74) Attorney, Agent, or Firm—Young & Thompson

(57) ABSTRACT

A device for frying food products in fat under vacuum conditions includes a rotating vacuum chamber for centrifuging the product after frying. The centrifuged product is directed through a valve in the bottom of the vacuum chamber to a sluice structure, and subsequently is subjected to atmospheric pressure.

13 Claims, 2 Drawing Sheets

DEVICE AND METHOD FOR FRYING PRODUCTS

BACKGROUND OF THE INVENTION

The present invention relates to a device for frying products such as slices in fat, comprising a vacuum vessel provided with a container for fat, supply means for said products, discharge means for said products, and removal means for water vapor, centrifuging means being present between said container means for fat and said discharge means, in a centrifuge chamber, having sluices for connecting with said vacuum vessel and the atmosphere, said centrifuge means being provided with an inlet near its stopend.

Description of the Related Art

Such a device is known from U.S. Pat. No. 5,988,051A.

It is known in the prior art to carry out the frying process at reduced pressure in a vacuum vessel, which makes it possible to work with a lower fat temperature. On the one hand, this extends the service life of the fat and, on the other hand, the absorption of fat is limited. It is known in the prior art to subsequently subject crisps fried in such a way to a mechanical vibration treatment or the like outside the vacuum vessel used in the process, in order to remove the last of the fat from the slices. Steam is added in the process. One problem here is that the mechanical energy supplied to the slices must be limited. The fact is that if this energy supply is too great, the brittle, hardened, just baked crisps will break, which is not desirable. This means that in practice only the outside of the crisps is heated and fat removed from them there.

If, for example, potato crisps are being fried, it is possible to achieve a fat percentage of approximately 24% using such a method.

U.S. Pat. No. 5,988,051 discloses removal of further fat from the products by subjecting said products to a centrifuge treatment in a vacuum chamber. After introduction of the product in the centrifuge, the centrifuge is started and fat material is removed. Subsequently connecting with the vacuum vessel is closed whilst connection is made to the surrounding atmosphere. The centrifuge body together with the product is removed from the centrifuge chamber and the product is removed from the centrifuge.

It has been found that despite these chips still tend to agglomerate, resulting in rejection of chip material.

SUMMARY OF THE INVENTION

The invention aims to obviate these drawbacks.

According to the invention this is realised with a device as described above in that said centrifuge means are provided with an outlet at its lower end opening into a discharge from said centrifuge chamber.

According to the invention after closing the connection with the vacuum vessel and opening the centrifuge chamber to the atmosphere immediately removal of the product is effected so that no agglomeration can occur.

Agglomeration of material can be further prevented in that the rotating centrifuge member is provided with portions which extend radially. A further step to prevent agglomeration and to improve the quality of the product and to prevent breakage of the product comprises introduction of the product whilst the centrifuge is rotating. A further advantage can be obtained by removal of the product whilst the centrifuge is still rotating.

According to a further preferred embodiment of the invention, the centrifuge means and more particular the rotatable container in which the chips are received is tilted relative to the vertical preferably with an angle of about 30° relative to the vertical. This improves both loading and unloading more particular if the centrifuge still rotates.

Because centrifuging is a batch wise operation preferably two centrifuges are provided being alternatively operated allowing for continuous feed of chips and other material to the centrifuges.

Means for regulating the residence time of the crisps in the vacuum vessel as uniformly and as accurately as possible can be present in the vacuum vessel. Combinations of conveyor belts and rotating wheels in the fat bath can be present for this purpose. Likewise, a separate belt, which forces the crisps into the fat, can be provided.

In the course of frying many foods, owing to the increased temperature of the fat, considerable quantities of water vapour are produced at the time of entry into a vacuum vessel. This increases the pressure in the vessel. In the prior art it is proposed that a large number of heavy vacuum pumps be used in order to remove this water vapour and maintain the vacuum.

It is proposed according to the invention that in the discharge of vapours, the water vapour is condensed before entering any vacuum pump. Because of removal of water by condensing water vapour the total vapour volume is substantially decreased meaning that it is not necessary to use heavy vacuum pumps. Such condensation can be produced by compressing the water vapour slightly using simple fans and guiding it along a cooled surface. It has been found that condensation occurs in the process. Of course, this measure can also be applied in the case of other vacuum installations known in the prior art.

The invention also relates to a method wherein the axis of centrifuging is about 30° relative to the vertical.

BRIEF DESCRIPTION OF THE DRAWINGS

The invention will be explained in greater detail below with reference to an exemplary embodiment illustrated in the drawing, in which.

DESCRIPTION OF THE PREFERRED EMBODIMENT

The device according to the present invention is indicated by 1 in the figures. This device is composed of a vacuum vessel 2 of considerable length The latter is provided with an inlet sluice construction 3 and an outlet sluice construction 4. Fat is present and is indicated by 5. This fat can be stored in a separate container. The fat level is kept constant by means of a fat storage container 8 and a fat supply line 9. A circulation system for fat (not shown in any further detail), in which the fat is filtered and heated up, is present. For a fat customarily used for flying potato crisps, an optimum temperature is lower than approximately 136° C.

Figure 1:
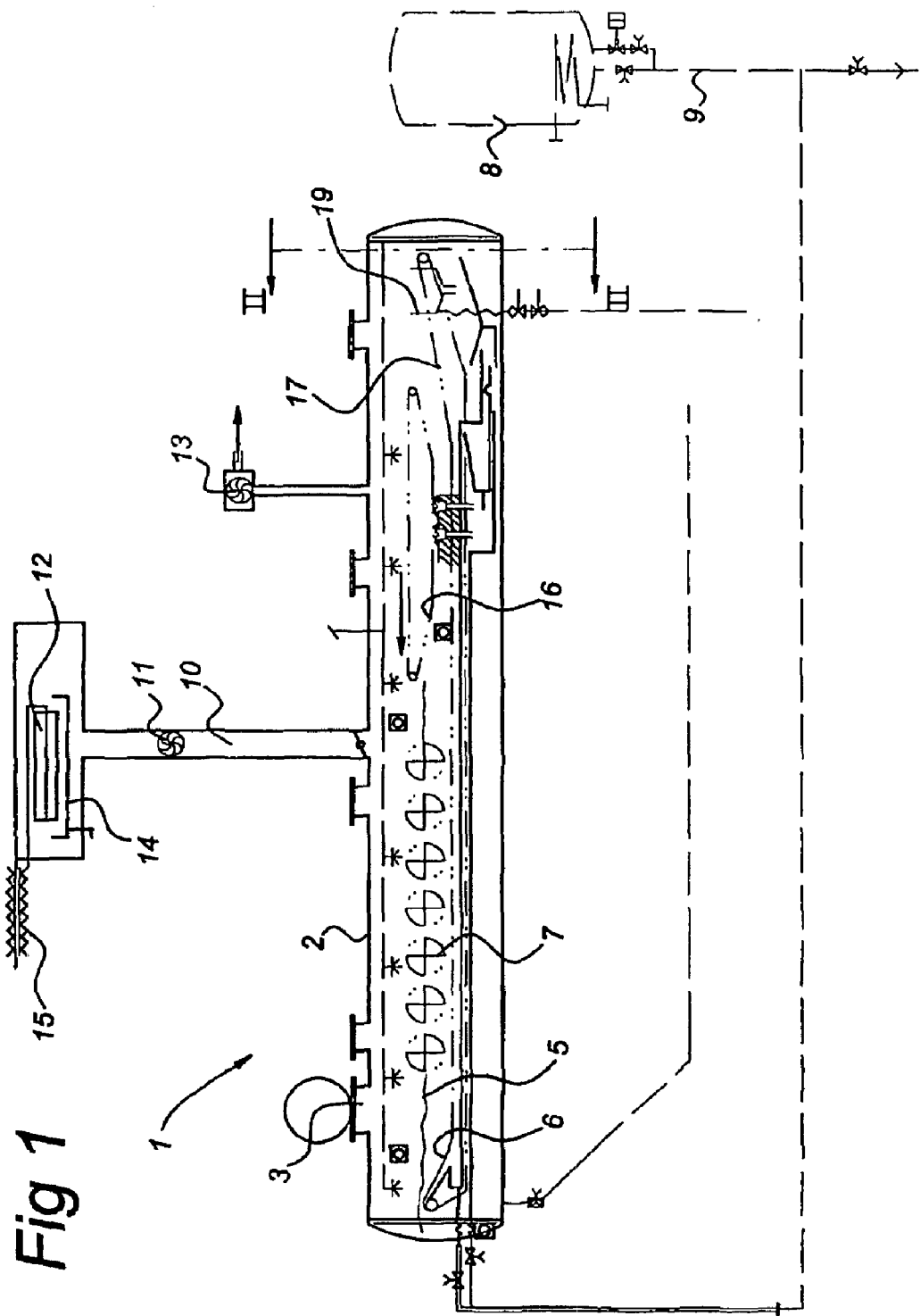
FIG. 1 shows the device according to the invention diagrammatically in longitudinal section.
Figure 2:
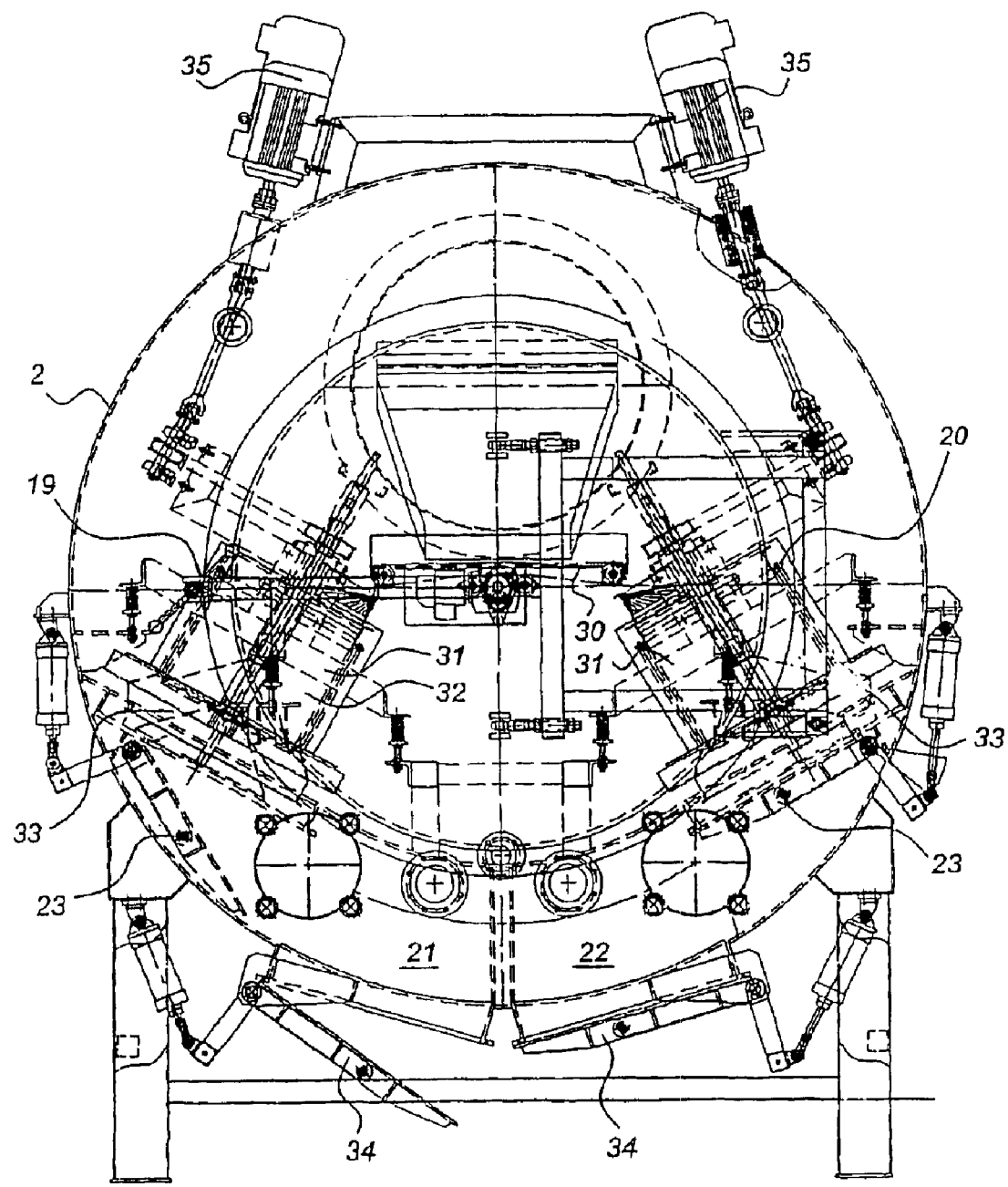
FIG. 2 shows cross section II—II according to FIG. 1.

Reference numeral 6 indicates a conveyor belt which moves through the liquid fat. Metering/control rollers, which accurately regulate the residence time of the product, are indicated by 7. A further conveyor belt is indicated by 16, and the arrow indicates that the latter is designed in such a way that it presses the products below the fat level. An elevator (extension of conveyor 6), which interacts with conveyor 18, is indicated by 17. This elevator opens on a cross belt 30 which can be driven to move (as seen in FIG. 2) both to the left and to the right i.e. either to centrifuge 19 or to centrifuge 20. In this case the centrifuges are placed at an angle of about 30° to the vertical, in order to make as much use as possible of the space in the vacuum vessel and improve charging/discharging of chips. Sluice chambers 21 and 22, which can be shut off by means of valves 23, 34 are present. Each centrifuge comprises a rotating body 31 having vertical separations 32. The bottom part of rotating bodies are provided by cones 33 which can move to and from the rotating body 31 to function as bottom valve. On the left side in FIG. 2 the bottom valve 33 is opened whilst it is closed on the right hand side. Drive motors 35 are provided for rotating the centrifuge body.

A vacuum pump is indicated by 13. A branch line for water vapour is indicated by 10. It contains a pump 11 in the form of a fan. The fans used can be so-called Rootes blowers. Reference numeral 12 indicates a condenser, which is connected to a further external heat exchanger 15. A collection tank for water is indicated by 14, which collection tank can be isolated with respect to the vacuum in a manner not illustrated in any further detail, or which can be drained in some way.

The device described above functions as follows:

The slices, such as potato slices, to be fried are introduced through the inlet sluice 3. During this process they fall downwards several tens of centimeters before reaching the fat level 5. During this fall the pores of the material of the slices are opened by the vacuum and the evaporating water. The pores do not seal immediately when the slices come into contact with the fat 5. The oil temperature is preferably 120° C. The product is then conveyed on belt 6, the residence time being accurately regulated by the rollers 7. A maximum residence time of approximately 360 seconds is mentioned as an example. All this depends, of course, on all kinds of characteristics, in particular the thickness of the crisps and the temperature of the fat. The crisps are pressed below the fat level by means of belt 16. The crisps are subsequently deposited on belt 30 and conveyed either to centrifuge 19 or 20. Bottom valve 33 of the related centrifuge is in the closed position. Charging of the centrifuge can be realised while the related centrifuge is still rotating at relative low speed. Because of the separations 32 in the rotating centrifuge body the crisps are evenly distributed over de volume of the centrifuge body. After filling the related centrifuge the crisps are subjected to a centrifuging treatment in centrifuges 19 and 20. The centrifuges have a diameter of 50 cm and preferably a speed of revolution of approximately 400 revolutions per minute. However, this diameter could be increased and a different rotational speed choosen. The centrifuging treatment is maintained for a maximum of 1 minute. During centrifuging the adjacent sluice 21 or 22 is brought under vacuum.

At the end of the centrifuge treatment at opened valve 23 (and closed valve 34) bottom valve 33 is opened. Because of the presence of such a bottom valve the crisps can immediately be discharged in for example sluice 21 without the danger of conglomeration. Subsequently valve 23 is closed and the related valve 34 is opened discharging the crisps. In the meantime the other centrifuge, for example centrifuge 20 is filled with new crisps.

By means of the device described above, it is possible to subject the crisps to a full frying treatment and treatment for the removal of fat in the course of an extremely short residence time. It has been found that the temperature of the crisps hardly rises above 60° during the frying, in view of the brief residence time. Moreover, the temperature of the crisps hardly falls after frying during the conveyance along belts 17 and 18 and supplying to the centrifuges 19 and 20. Drops in temperature of approximately 5° C. have been found. This means that the crisps remain relatively soft and have great mechanical strength, in other words, they will not readily break during the centrifuging treatment. Furthermore, the vacuum hinders rapid ageing of the fat used in the system and prevents fat from solidifying in the crisps.

Although the invention is described above with reference to a preferred embodiment, it must be understood that numerous modifications can be made thereto. Adaptations can be made, depending on the product to be prepared and the specifications set for the product. Of course, it is also possible to carry out the various steps in separate vacuum vessels connected to each other in some way. These and similar modifications immediately spring to mind for a person skilled in the art on reading the above description, and lie within the scope of the appended claims.

What is claimed is:

1. A method for frying products, comprising the sequential steps of:

exposing products to heated fat at a vacuum pressure, removal of fat from said products by introducing the products into a centrifuge chamber of a centrifuge, centrifuging the products in said centrifuge chamber, while under the vacuum pressure, as a centrifuge treatment step forming centrifuged products, discharging the centrifuged products directly from said centrifuge chamber through a bottom valve of the centrifuge via an inlet valve of a sluice chamber located at the bottom of said centrifuge chamber and connected with an outlet valve of said sluice chamber closed to the atmosphere during said centrifuging treatment step, wherein, at the end of the centrifuge treatment step, with said inlet valve open, said bottom valve is opened to immediately discharge said centrifuged products from said centrifuge chamber directly to said sluice chamber, and after which immediate discharge of the centrifuged products to said sluice chamber, the inlet valve is closed and the outlet valve is opened, wherein during the step of removal of fat by introducing the products into the centrifuge chamber, the introduction of said products is done while said centrifuge chamber is rotated.

2. A method according to claim 1, wherein the axis of centrifuging is about 30° relative to the vertical.

3. A method according to claim 1, wherein during the step of discharging the centrifuged products from said centrifuge chamber through a bottom valve of the centrifuge, said centrifuge chamber is rotating.

4. A method according to claim 1, wherein vapors, comprising water vapor, are discharged through a vacuum pump, the water vapor contained in said vapors being condensed before entering said vacuum pump.

5. A method according to claim 4, wherein said water vapor is compressed and guided along a cooling surface.

6. The method of claim 1, wherein the inlet valve of a sluice chamber is located adjacent the bottom valve of the centrifuge chamber, positioned to immediately discharge said centrifuged products from said centrifuge chamber directly to said sluice chamber without holding said centrifuged products between the bottom valve and the inlet valve.

7. A method frying products, comprising the sequential steps of:

exposing products to heated fat at a vacuum pressure to obtain heated products;

introducing the heated products into a centrifuge chamber of a centrifuge;

centrifuging the heated products in the centrifuge chamber to remove fat from the heated products and obtain centrifuged products;

at an end of the centrifuging step, discharging the centrifuged products from the centrifuge chamber immediately to the sluice chamber by first opening the inlet valve of a sluice chamber located adjacent a bottom of the centrifuge chamber, and second, with the inlet valve remaining open, opening the bottom valve of the centrifuge in communication with the opened inlet valve to allow the centrifuged products to immediately discharge from the centrifuge to the sluice chamber, during the discharging step, maintaining an outlet valve of the sluice chamber closed to the atmosphere while the inlet valve and the bottom valve are both open; and after the discharging step, first closing the inlet valve and second opening the outlet valve, wherein after each centrifuging step, the centrifuged products are discharged directly into sluice chamber.

8. A method according to claim 7, wherein during the step of introducing the heated products into a centrifuge chamber of a centrifuge, the centrifuge chamber is rotated.

9. A method according to claim 8, wherein during the step of discharging the centrifuged product from the centrifuge chamber through a bottom valve of the centrifuge, the centrifuge chamber is rotating.

10. The method of claim 7, wherein, the inlet valve of a sluice chamber is located adjacent the bottom valve of the centrifuge so that, during the discharge step when the inlet valve and bottom valve are both open, the centrifuged products pass from the open bottom valve to immediately discharge into the open inlet valve of the sluice chamber.

11. A method frying products, comprising the sequential steps of:

vacuum heating products with fat to obtain heated products;

removing fat from the heated products by centrifuging the heated products in a centrifuge chamber at a vacuum pressure to obtain centrifuged products;

at an end of the centrifuging step, discharging the centrifuged products directly from the centrifuge chamber into the sluice chamber to avoid conglomeration, by first opening an inlet valve of a sluice chamber and second opening a bottom valve of the centrifuge chamber in communication with the opened inlet valve to immediately discharge the centrifuged products to the sluice chamber, during the discharging step an outlet valve of the sluice chamber being closed to the atmosphere; and after the discharging step, closing the inlet valve and opening the outlet valve, wherein, the inlet valve of the sluice chamber is located adjacent the bottom valve of the centrifuge chamber.

12. A method according to claim 11, comprising a further step of introducing the heated products into the centrifuge chamber of a centrifuge with the centrifuge chamber being rotated.

13. A method according to claim 12, wherein during the step of discharging the centrifuged product from the centrifuge chamber through a bottom valve of the centrifuge, the centrifuge chamber is rotating.

* * * * *